(12) United States Patent
Miyauchi (10) Patent No.: US 6,873,699 B2
(45) Date of Patent: Mar. 29, 2005

(54) NETWORK LINKAGE TYPE PRIVATE BRANCH EXCHANGE SYSTEM AND CONTROL METHOD THEREOF

(75) Inventor: Tatsuya Miyauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 09/840,140

(22) Filed: Apr. 24, 2001

(65) Prior Publication Data

US 2001/0033645 A1 Oct. 25, 2001

(30) Foreign Application Priority Data

Apr. 24, 2000 (JP) ........................................ 2000-122048

(51) Int. Cl.⁷ .............................................. H04M 7/00
(52) U.S. Cl. ............. 379/225; 379/266.04; 379/265.02; 379/211.02; 379/212.01; 379/221.03
(58) Field of Search ............................ 379/225, 265.02, 379/265.03, 198, 221.01, 221.03, 227, 232, 45, 266.04, 266.1, 211.07, 212.01

(56) References Cited

U.S. PATENT DOCUMENTS

| | | | | |
|---|---|---|---|---|
| 5,031,211 A | * | 7/1991 | Nagai et al. | 379/221.04 |
| 5,384,841 A | * | 1/1995 | Adams et al. | 379/266.04 |
| 5,402,474 A | * | 3/1995 | Miller et al. | 379/93.12 |
| 5,455,855 A | * | 10/1995 | Hokari | 379/229 |
| 5,526,350 A | * | 6/1996 | Gittins et al. | 370/468 |
| 5,715,307 A | * | 2/1998 | Zazzera | 379/265.03 |
| 5,754,639 A | * | 5/1998 | Flockhart et al. | 379/266.05 |
| 5,778,058 A | * | 7/1998 | Gavin | 379/225 |
| 5,805,692 A | * | 9/1998 | Oerlemans et al. | 379/225 |
| 5,825,779 A | * | 10/1998 | Putnins et al. | 370/477 |
| 5,923,745 A | * | 7/1999 | Hurd | 379/265.02 |
| 6,134,315 A | * | 10/2000 | Galvin | 379/219 |
| 6,614,895 B1 | * | 9/2003 | Impey et al. | 379/127.01 |

FOREIGN PATENT DOCUMENTS

| | | |
|---|---|---|
| JP | A 4-265054 | 9/1992 |
| JP | 5-7210 | 1/1993 |
| JP | 5-7244 | 1/1993 |
| JP | 06-161859 | 6/1994 |
| JP | A 7-7551 | 1/1995 |
| JP | 09-198293 | 7/1997 |
| JP | 11-249943 | 9/1999 |
| JP | A 11-275618 | 10/1999 |

* cited by examiner

Primary Examiner—Fan Tsang
Assistant Examiner—Simon P. Sing
(74) Attorney, Agent, or Firm—Young & Thompson (57) ABSTRACT

A network linkage type private branch exchange system including a plurality of private branch exchanges, a plurality of telephone network interfaces for relaying data between a plurality of telephone networks and each private branch exchange, a plurality of terminal devices such as an extension for transmitting the data between the respective private branch exchanges and a plurality of operators, a plurality of computers each connected to each private branch exchange for conducting predetermined processing based on the data, and a data communication line to which each private branch exchange is connected, in which each private branch exchange transmits data to a computer connected to an arbitrary private branch exchange other than the private branch exchange in question through the data communication line.

21 Claims, 7 Drawing Sheets

AT CERTAIN TIME ZONE (SPAN) AND
CERTAIN PLACE OF COLLECTION (FOR EACH OPERATOR, EACH GROUP, ..),
    TOTAL NUMBER OF CALLS
    AVERAGE COMMUNICATION TIME PERIOD
    THE NUMBER OF FAILURES IN COLLECTION
    TOTAL WORKING TIME

NETWORK LINKAGE TYPE PRIVATE BRANCH EXCHANGE SYSTEM AND CONTROL METHOD THEREOF

BACKGROUND OF THE INVENTION

1. Field of the Invention

The present invention relates to a network linkage type private branch exchange (Private Branch Exchange, hereinafter referred to as a "PBX") system provided in an order reception center of a mail-order firm and the like, and more particularly, to a network linkage type PBX system enabling information to be exchanged among computers connected to a plurality of PBXS, a control method thereof and a recording medium recording a control program therefor.

2. Description of the Related Art

A network linkage type PBX system is a computer network where voice data is transmitted and received among terminal devices (e.g. telephone) connected to a plurality of PBXs through a switched line using a telephone network, while information is exchanged between computers connected to each PBX through other dedicated line than the switched line. Use of this computer network enables computers disposed in a plurality of places of business to divisionally possess programs and data and use the same among them or when a certain computer needs processing exceeding its own capacity, allows the computer to ask other computer in the network to conduct the processing and return the processing results thereafter.

Figure 6:
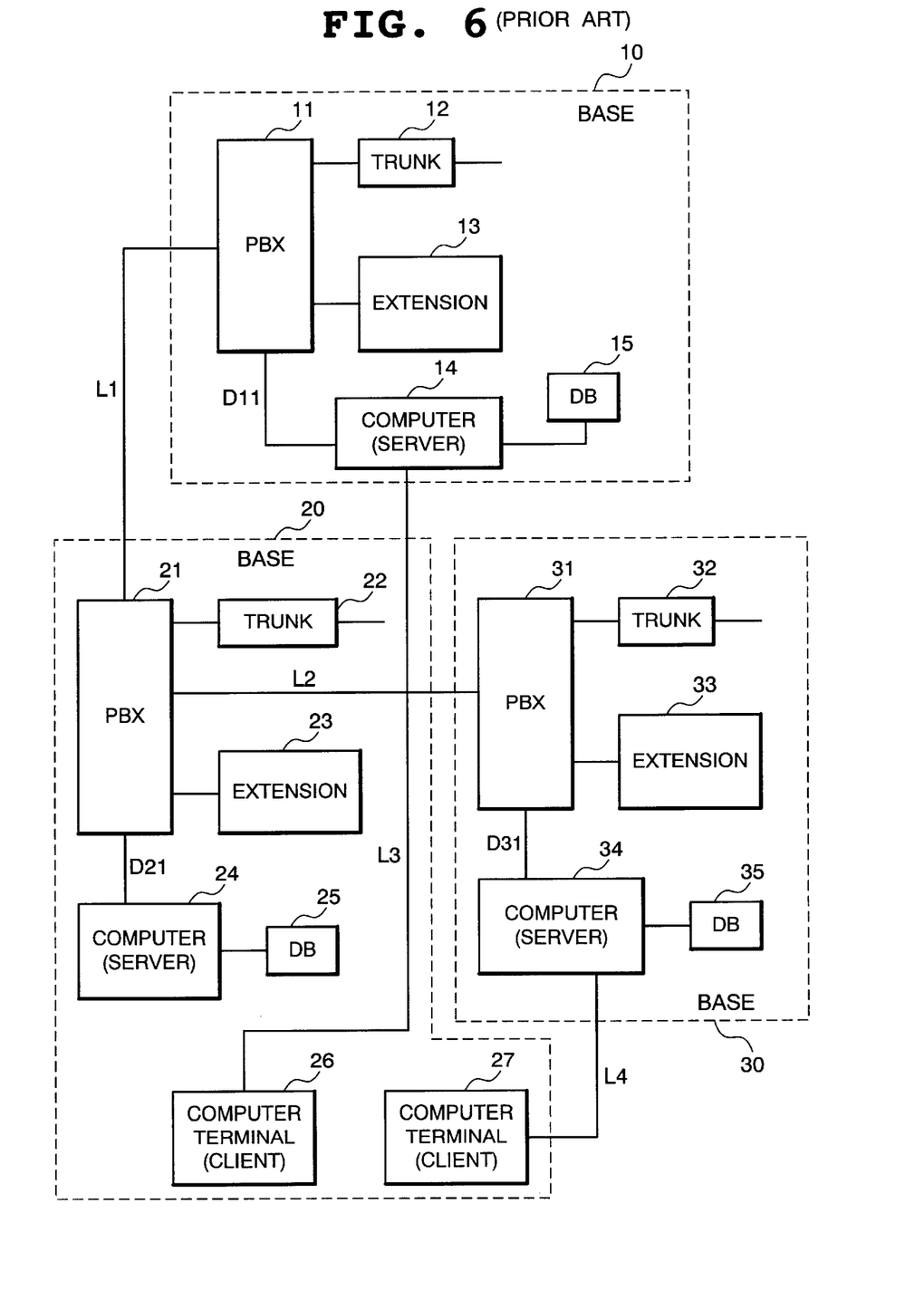
FIG. 6 is a diagram showing a structure of a conventional network linkage type PBX system.

A network linkage type PBX system of this kind has, for example, as illustrated in FIG. 6, bases 10, 20 and 30 such as an order reception center of a mail-order firm. The base 10 includes a PBX11, a telephone network interface (e.g. trunk) 12, a terminal device (e.g. extension) 13, a computer (server) 14, and a data base (DB) 15. The base 20 includes, a PBX21, a trunk 22, an extension 23, a computer (server) 24, a data base (DB) 25, and computer terminals (clients) 26 and 27. The base 30 includes a PBX31, a trunk 32, an extension 33, a computer (server) 34 and a data base (DB) 35. Connected to the PBX11 through a switched line L1 using a telephone network is the PBX21 to which the PBX31 is connected through a switched line L2. To the computer (server) 14, the computer terminal (client) 26 is connected through a dedicated line L3. To the computer (server) 34, the computer terminal (client) 27 is connected through a dedicated line L4. These dedicated lines L3 and L4 are formed, for example, by a WAN (Wide Area Network).

The trunks 12, 22 and 32 relay data between the telephone network and the PBXs 11, 21 and 31, respectively. The extensions 13, 23 and 33 transmit the data between the PBXs 11, 21, 31 and an operator, respectively. The computers (servers) 14, 24, and 34 are connected to the PBXs 11, 21 and 31, respectively, to conduct predetermined processing based on the data. In the data bases (DB) 15, 25 and 35, data necessary for the processing at the computers (servers) 14, 24 and 34 is stored. The computer terminals (clients) 26 and 27 are provided for subsidiary work for the computer (server) 24.

Figure 7:
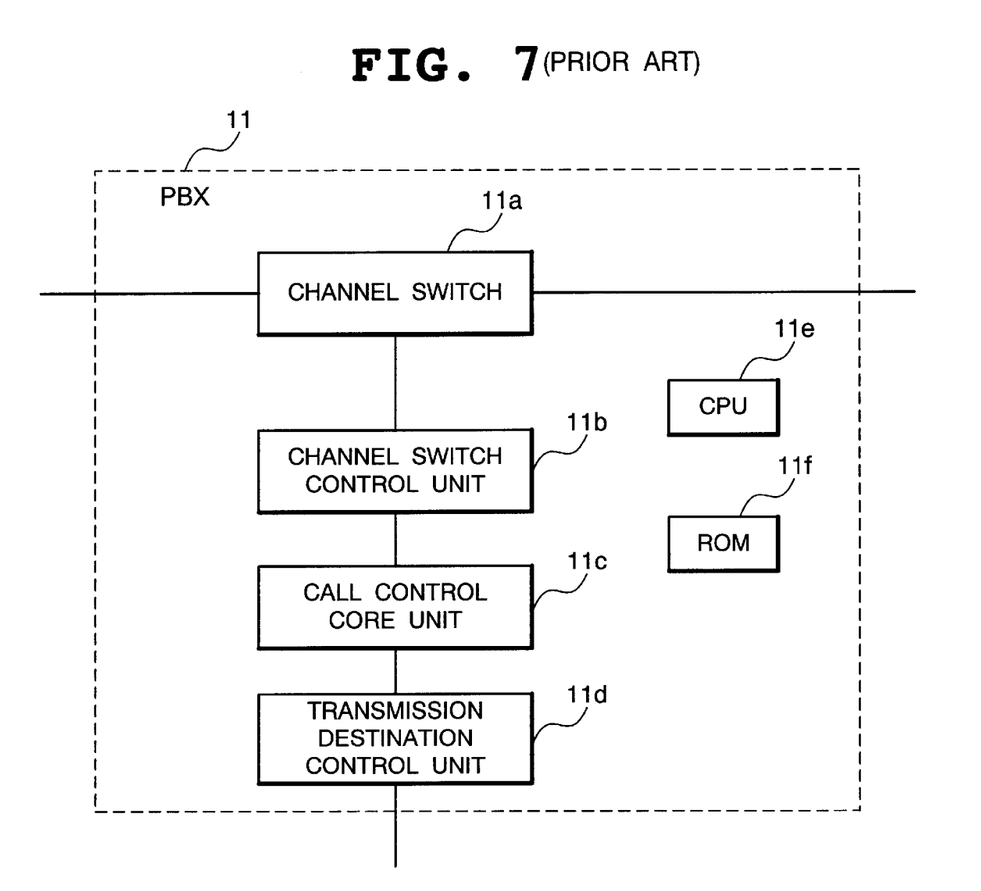
FIG. 7 is a diagram showing a structure of a PBX11 in FIG. 6.

FIG. 7 is a diagram schematically showing one example of a structure of the PBX11 in FIG. 6.

The PBX11 includes a channel switch 11a, a channel switch control unit 11b, a call control core unit 11c, a communication control unit 11d, a central processing unit (hereinafter, referred to as "CPU") 11e and a memory (e.g. ROM) 11f. The channel switch 11a establishes a connection between the trunk 12 and the extension 13. The channel switch control unit 11b gives an instruction on operation to the channel switch 11a. The call control core unit 11c controls switching operation of the PBX11. The communication control unit 11d sends data based on a low layer protocol such as TCP/IP. The CPU 11e controls the entire PBX11. In the ROM 11f, a control program for operating the CPU 11e is recorded. The PBXs 21 and 31 have the same structure as that of the PBX11.

Figure 8:
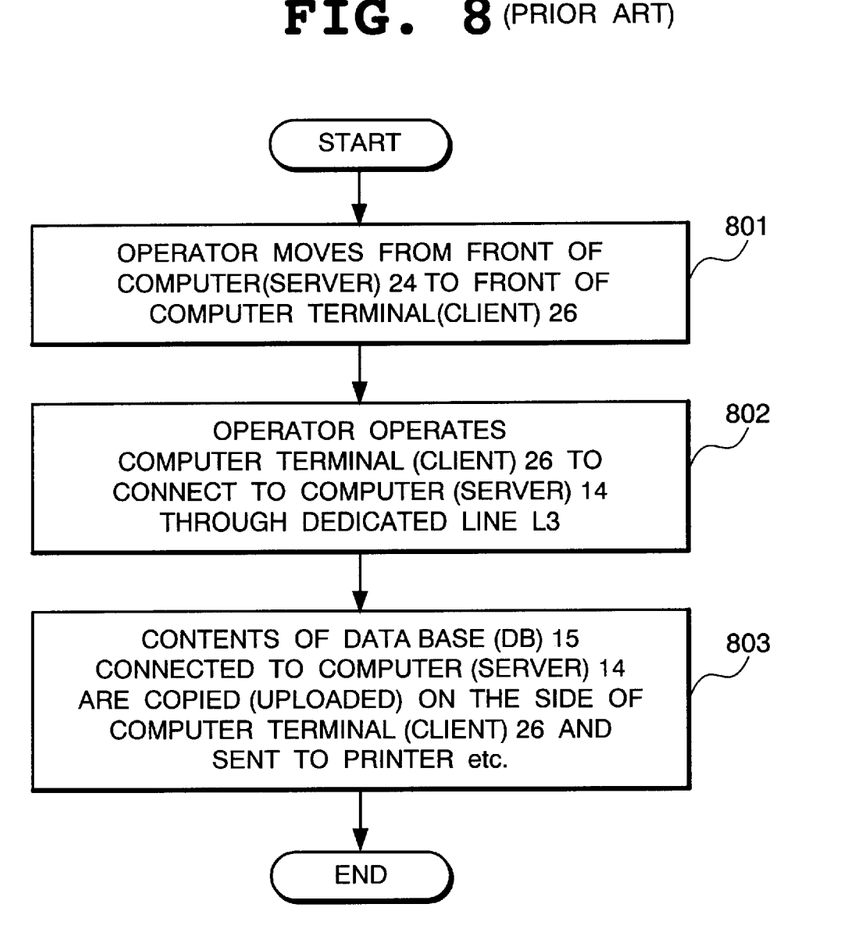
FIG. 8 is a flow chart for use in explaining operation of the network linkage type PBX system.

FIG. 8 is a flow chart for use in explaining operation of the network linkage type PBX system shown in FIG. 6.

With reference to the figure, description will be made of operation conducted when the network linkage type PBX system of FIG. 6 is disposed in an order reception center of a mail-order firm.

Customer dials a telephone number of the base 10 by a telephone in order to order a commodity. Then, the call arrives at the PBX11 through the trunk 12 from the telephone network and the PBX11 is connected to the extension 13 by the control of the CPU11e in the PBX11, so that an operator of the extension 13 conducts work for accepting an order. Also at the bases 20 and 30, the same order reception work is conducted. Then, operation record data D11, D21 and D31 of a series of order reception work is output from the PBXs 11, 21 and 31, summed up at the computers (servers) 14, 24 and 34 and stored in the data bases (DB) 15, 25 and 35, respectively.

When a failure occurs in the computer (server) 14 here, for example, an operator of the computer (server) 24 moves from the front of the computer (server) 24 to the front of the computer terminal (client) 26 as shown in FIG. 8 (Step 801). The operator operates the computer terminal (client) 26 to connect the computer terminal (client) 26 to the computer (server) 14 through the dedicated line L3 (Step 802). The contents of the data base (DB) 15 connected to the computer (server) 14 are copied (uploaded) on the side of the computer terminal (client) 26 and sent out to a printer not shown or the like (Step 803).

Similarly, when a failure occurs in the computer (server) 34, the operator moves from the front of the computer (server) 34 to the front of the computer terminal (client) 27. The operator operates the computer terminal (client) 27 to connect the computer terminal (client) 27 to the computer (server) 34 through the dedicated line L4. The contents of the data base (DB) 35 connected to the computer (server) 34 are appropriately copied (uploaded) on the side of the computer terminal (client) 27 and sent out to a printer not shown or the like.

The above-described conventional network linkage type PBX system, however, has the following problems.

More specifically, in a conventional network linkage type PBX system, the PBXs 11, 21 and 31 and the computers (servers) 14, 24 and 34 are one-to-one connected to each other. When failures occur in the computers (server) 14 and 34, therefore, for the PBXs 11 and 31 and a remote computer terminal to inter-work, it is necessary to provide the base 20 with the computer terminals (clients) 26 and 27 for subsidiary work and also with the dedicated lines L3 and L4 to be disposed without the need of the PBX 21, which makes facility complicated.

SUMMARY OF THE INVENTION

An object of the present invention, taking the above-described conditions into consideration, is to provide a network linkage type PBX system having a relatively simple structure requiring no provision of the computer terminals (clients) 26 and 27 for subsidiary work and the dedicated lines L3 and L4.

According to one aspect of the invention, a network linkage type private branch exchange system, comprises a plurality of private branch exchanges, a plurality of telephone network interfaces for relaying data between a plurality of telephone networks and each the private branch exchange, a plurality of terminal devices for transmitting the data between each the private branch exchange and a plurality of operators, a plurality of computers each connected to each the private branch exchange for conducting predetermined processing based on the data, and a data communication line to which each the private branch exchange is connected, wherein each the private branch exchange transmits the data to the computer connected to an arbitrary private branch exchange other than the private branch exchange in question through the data communication line.

In the preferred construction, the system is applied to mail-order reception work, and the private branch exchange transmits accumulated data of mail-order reception sent through the telephone network and accepted at the terminal device to the computer connected to an arbitrary private branch exchange other than the private branch exchange for summing up the accumulated data through the data communication line.

In another preferred construction, each the private branch exchange automatically transmits the data to the computer through the data communication line all the time.

In another preferred construction, each the private branch exchange transmits the data to the computer through the data communication line when necessary.

In another preferred construction, each the private branch exchange further includes a transmission destination control unit for determining whether the data is to be transmitted to the computer connected to the private branch exchange in question or to an arbitrary private branch exchange other than the private branch exchange in question, a first communication control unit for transmitting the data to the computer connected to the private branch exchange in question based on determination results of the transmission destination control unit, and one or a plurality of second communication control units for transmitting the data to an arbitrary private branch exchange other than the private branch exchange in question based on determination results of the transmission destination control unit.

In another preferred construction, the data communication line is formed of a switched line using the telephone network.

According to another aspect of the invention, a method of controlling a network linkage type private branch exchange system including a plurality of private branch exchanges, a plurality of telephone network interfaces for relaying data between a plurality of telephone networks and each the private branch exchange, a plurality of terminal devices for transmitting the data between each the private branch exchange and a plurality of operators, a plurality of computers each connected to each the private branch exchange for conducting predetermined processing based on the data, and a data communication line to which each the private branch exchange is connected, wherein the data is transmitted to the computer connected to an arbitrary private branch exchange other than the private branch exchange in question through the data communication line.

In the preferred construction, the network linkage type private branch exchange system is applied to mail-order reception work, and accumulated data of mail-order reception sent through the telephone network and accepted at the terminal device is transmitted to the computer connected to an arbitrary private branch exchange other than the private branch exchange for summing up the accumulated data through the data communication line.

In another preferred construction, the data is automatically transmitted to the computer through the data communication line all the time.

In another preferred construction, the data is transmitted to the computer through the data communication line when necessary.

In another preferred construction, determination is made whether the data is to be transmitted to the computer connected to the private branch exchange in question or to an arbitrary private branch exchange other than the private branch exchange in question to transmit the data based on the determination results.

In another preferred construction, determination is made whether the data is to be transmitted to the computer connected to the private branch exchange in question or to an arbitrary private branch exchange other than the private branch exchange in question to automatically transmit the data based on the determination results all the time.

In another preferred construction, for the data communication line, a switched line using the telephone network is used.

According to a further aspect of the invention, a computer readable memory storing a control program which realizes a function of a network linkage type private branch exchange system including a plurality of private branch exchanges, a plurality of telephone network interfaces for relaying data between a plurality of telephone networks and each the private branch exchange, a plurality of terminal devices for transmitting the data between each the private branch exchange and a plurality of operators, a plurality of computers each connected to each the private branch exchange for conducting predetermined processing based on the data, and a data communication line to which each the private branch exchange is connected, wherein the control program transmits the data to the computer connected to an arbitrary private branch exchange other than the private branch exchange in question through the data communication line.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
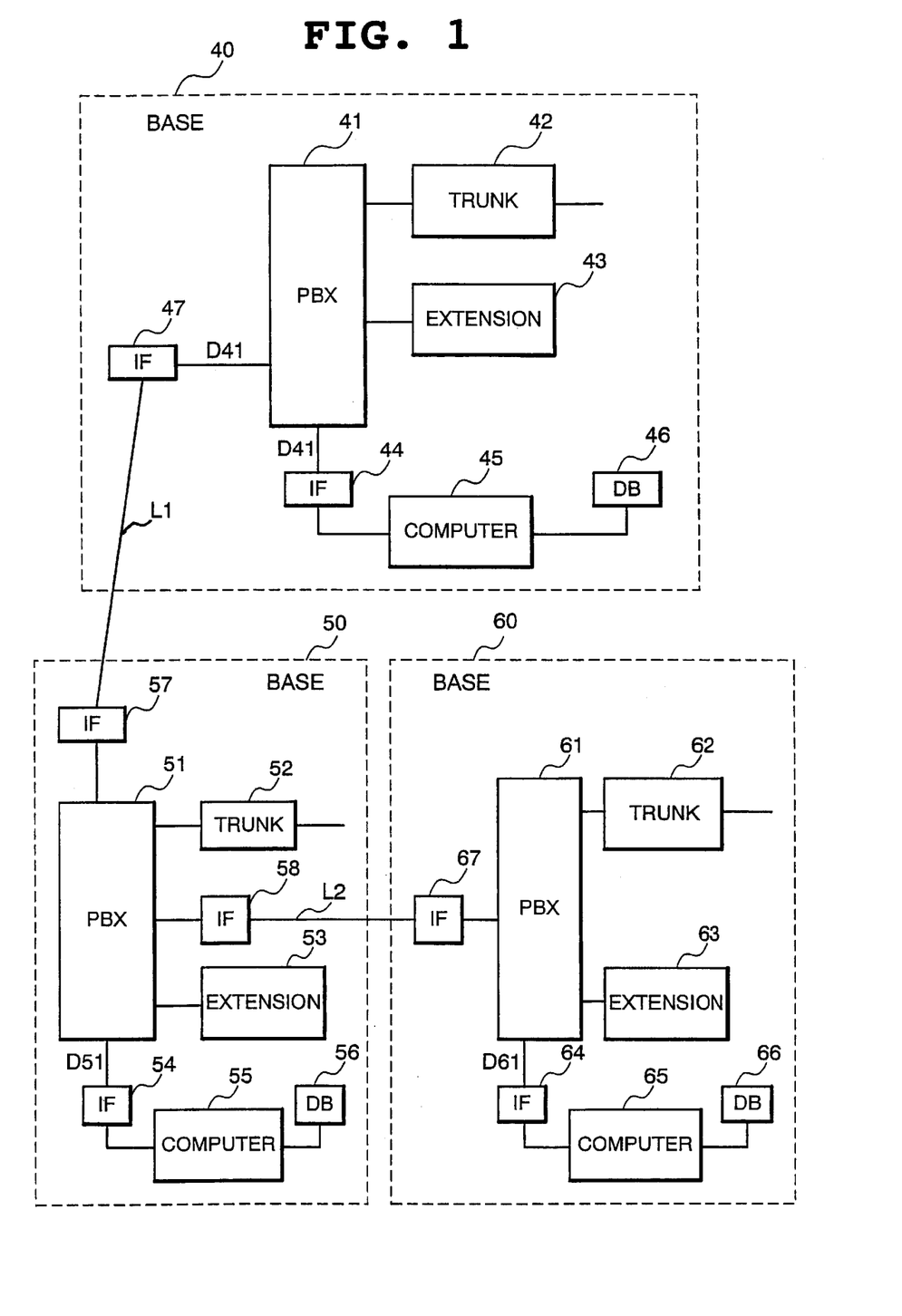
FIG. 1 is a block diagram showing an electrical structure of a network linkage type PBX system according to an embodiment of the present invention.

FIG. 1 is a block diagram showing an electrical structure of a network linkage type PBX system according to an embodiment of the present invention.

The network linkage type PBX system of this mode has, for example, as illustrated in the figure, bases 40, 50 and 60 such as an order reception center of a mail-order firm. The base 40 includes a PBX41, a telephone network interface (e.g. trunk) 42, a terminal device (e.g. extension) 43, an interface 44, a computer 45, a data base (DB) 46 and an interface 47.

The base 50 includes, a PBX51, a trunk 52, an extension 53, an interface 54, a computer 55, a data base (DB) 56 and interfaces 57 and 58. The base 60 includes a PBX61, a trunk 62, an extension 63, an interface 64, a computer 65, a data base (DB) 66 and an interface 67.

To the interface (IF) 47, the interface (IF) 57 is connected through a switched line L1 using a telephone network and to the interface (IF) 58, the interface (IF) 67 is connected through a switched line L2.

The trunks 42, 52 and 62 relay data between the telephone network and the PBXs 41, 51 and 61, respectively. The extensions 43, 53 and 63 transmit the data between the PBXs 41, 51 and 61 and an operator, respectively. The computers 45, 55 and 65 are connected to the PBXs 41, 51 and 61 through the interfaces (IF) 44, 54 and 64, respectively, to conduct predetermined processing based on the data. In the data bases (DB) 46, 56 and 66, data necessary for the processing in the computers 45, 55 and 65 is stored.

Figure 2:
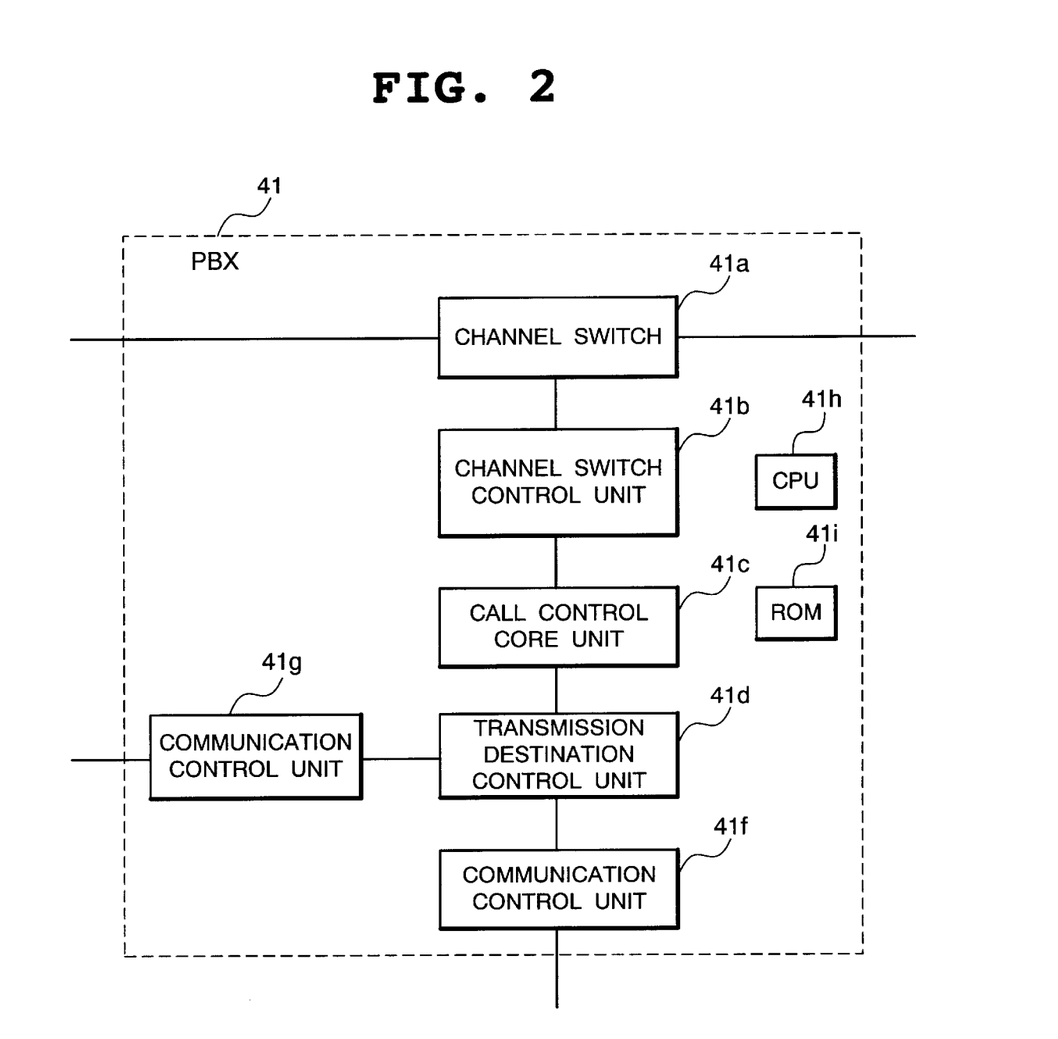
FIG. 2 is a diagram showing a structure of a PBX41 illustrated in FIG. 1.

FIG. 2 is a block diagram showing one example of a structure of the PBX41 of the base 40 illustrated in FIG. 1.

The PBX 41 includes a channel switch 41a, a channel switch control unit 41b, a call control core unit 41c, a transmission destination control unit 41d, first and second communication control units 41f and 41g, a CPU 41h and a recording medium (e.g. ROM) 41i.

The channel switch 41a establishes a connection between the trunk 42 and the extension 43. The channel switch control unit 41b gives an instruction on operation to the channel switch 41a. The call control core unit 41c controls switching operation of the PBX41. The transmission destination control unit 41d determines a data transmission destination. The communication control units 41f and 41g send out data based on a low layer protocol such as a TCP/IP. The CPU 41h controls the entire PBX41. In the ROM 41i, a control program for operating the CPU 41h is recorded. The other bases PBXs 51 and 61 have the same structure as that of the PBX41.

Figure 3:
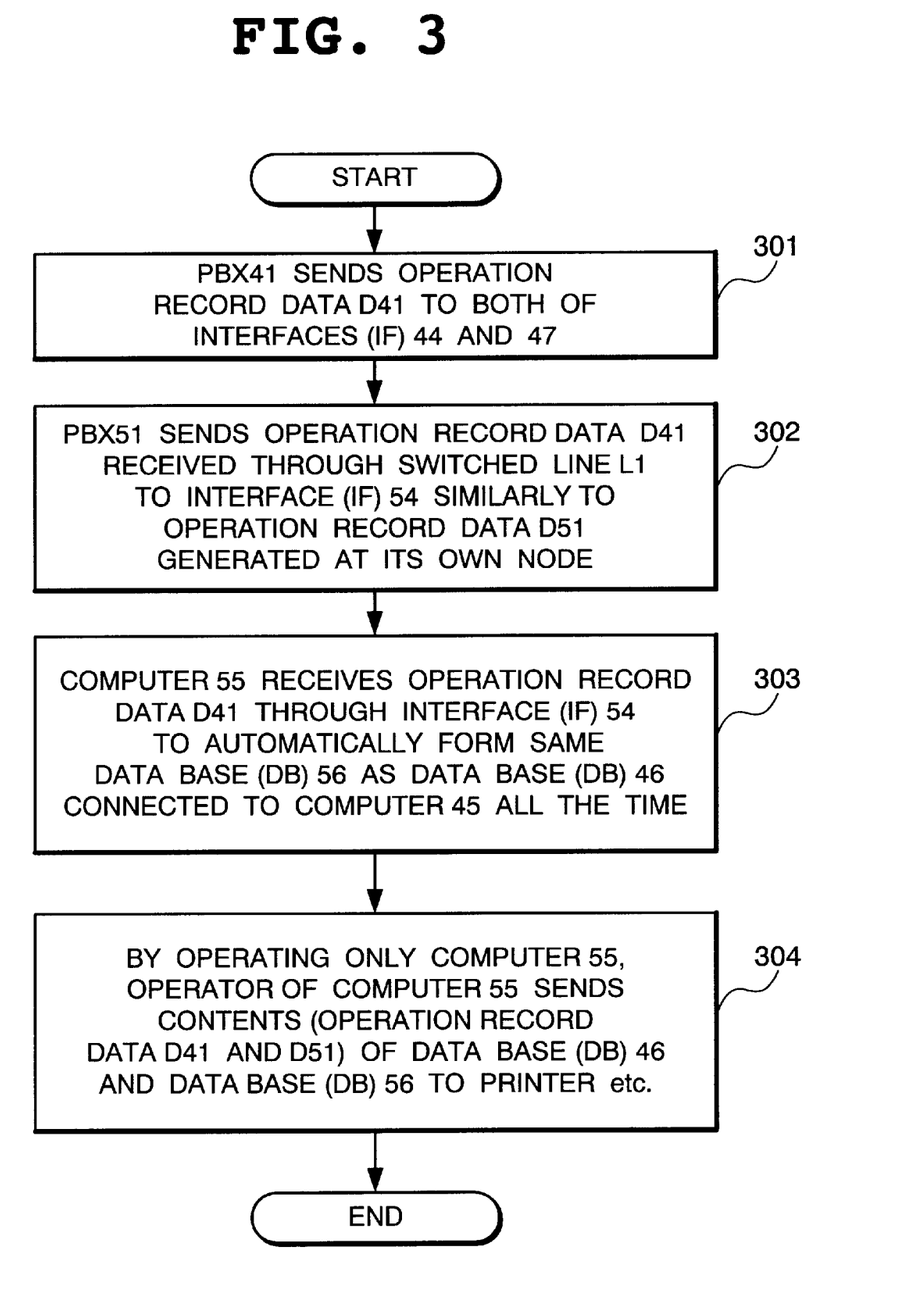
FIG. 3 is a flow chart for use in explaining operation of the network linkage type PBX system illustrated in FIG. 1.
Figure 4:
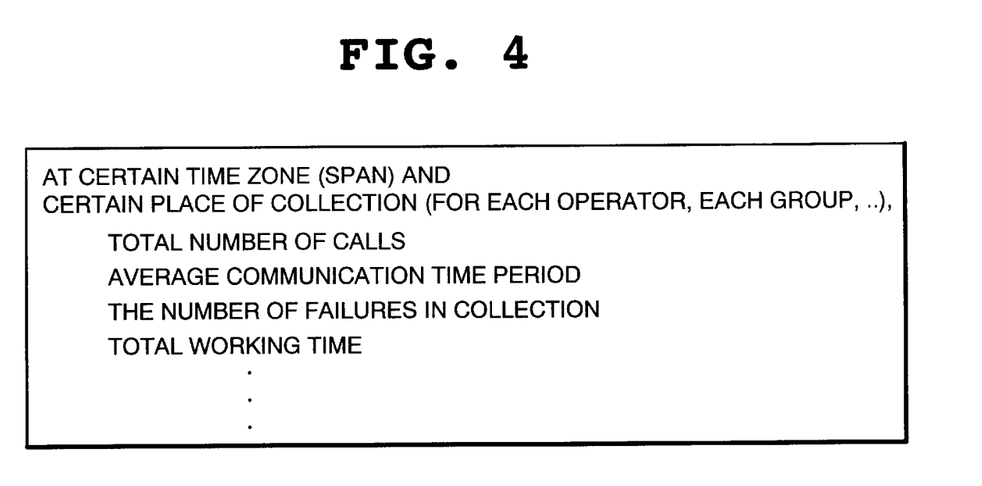
FIG. 4 is a diagram showing operation record data.
Figure 5:
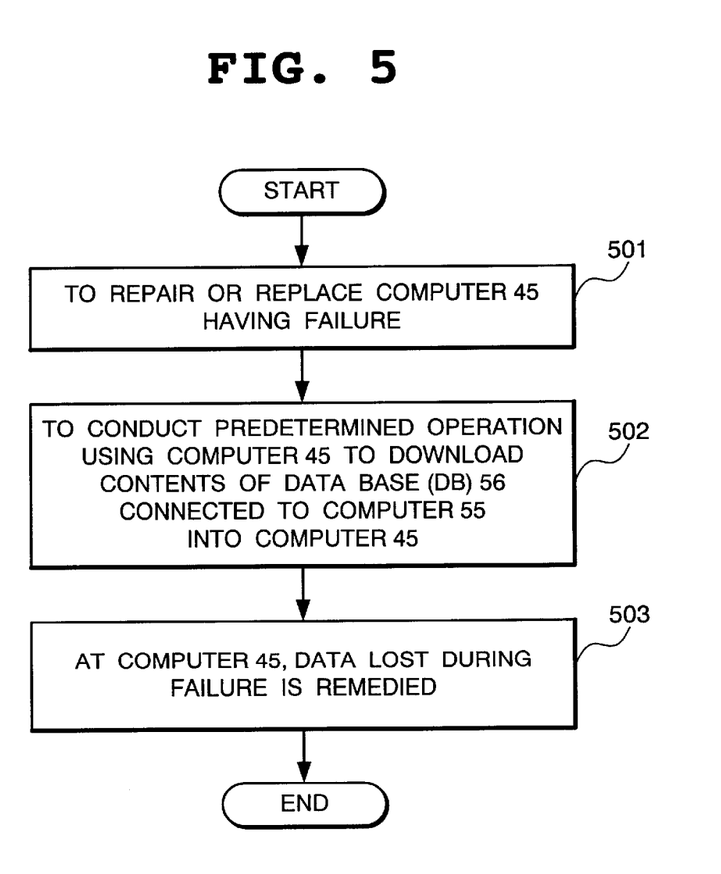
FIG. 5 is a flow chart for use in explaining operation to be conducted when a failure occurs in a computer in the network linkage type PBX system.

FIG. 3 is a flow chart for use in explaining operation of the network linkage type PBX system illustrated in FIG. 1, FIG. 4 is a diagram showing one example of operation record data and FIG. 5 is another flow chart for use in explaining operation of the network linkage type PBX system of FIG. 1.

With reference to these figures, description will be made of operation conducted when the network linkage type PBX system of this mode is disposed in an order reception center of a mail-order firm.

Customer dials, for example, a telephone number of the base 40 by a telephone in order to order a commodity. Then, the call arrives at the PBX41 through the trunk 42 from the telephone network and the PBX41 is connected to the extension 43 by the control of the CPU 41h in the PBX41, so that an operator of the extension 43 conducts work for accepting an order. Also at the bases 50 and 60, the same order reception work is conducted.

Then, operation record data D41, D51 and D61 of a series of order reception work is output from the PBXs 41, 51 and 61, summed up at the computers (servers) 45, 55 and 65 and stored in the data bases (DB) 46, 56 and 66, respectively.

At this time, as a computer for summing up the operation record data D41, the computer 55 or the computer 65 may be used other than the computer 45.

When the operation record data D41 is summed up by the computer 55, for example, the PBX41 sends out the operation record data D41 to both of the interfaces (IF) 44 and 47 as illustrated in FIG. 3 (Step 301).

The BPX 51 sends out the operation record data D41 received through the switched line L1 to the interface (IF) 54 similarly to the operation record data D51 generated at the PBX51 (Step 302).

The computer 55 receives the operation record data D41 through the interface (IF) 54 to automatically form the same data base (DB) 56 as the data base (DB) 46 connected to the computer 45 all the time (Step 303).

Then, operating only the computer 55, the operator of the computer 55 sends out the contents of the data base (DB) 46 and the data base (DB) 56 (that is, operation record data D41 and D51) to a printer not shown or the like (Step 304).

The operation record data D41, D51 and D61 is composed, for example, of a total number of calls, an average communication time period, the number of failures in collection, a total working time and the like in a certain time zone (span) at a certain collection place (for each operator, each group . . . ) as shown in FIG. 4.

Here, when a failure occurs, for example, in the computer 45 in the network linkage type PBX system of FIG. 1, the computer 45 having the failure will be repaired or replaced as shown in FIG. 5 (Step 501).

Conduct predetermined operation by using the computer 45 to download the contents of the data base (DB) 56 connected to the computer 55 into the computer 45 (Step 502).

As a result, data lost during the failure will be remedied at the computer 45 (Step 503).

As described in the foregoing, since in the present embodiment, the same data is accumulated also at the computer 55, even when a failure occurs abruptly, for example, in the computer 45, loss of management data crucial for an operator can be avoided to replace the function quickly. Moreover, even when the computer 55 is disposed at a place remote from the computer 45, because no dedicated lines for the computers 45 and 55 other than the switched line L1 is necessary and no computer terminal for subsidiary work is necessary, facility will be simplified to reduce operation costs. Furthermore, even when managers operating the computers 45, 55 and 65 and operators of the extensions 43, 53 and 63 have residences and relationships changed due to a change of an organization of a place of business or a change of a job system, it is unnecessary to change facilities in the bases 40, 50 and 60, which makes it possible to flexibly cope with the change.

Although the embodiment of the present invention has been described in detail with reference to the drawings, specific structure is not limited to that of the present embodiment and any change in design and the like within the scope of the present invention are included in the present invention. For example, although in the present embodiment, the network linkage type PBX system is formed of a bus-type network, it may be of a ring or star network. In addition, the number of the bases 40, 50 and 60 is not limited to three but be an arbitrary number not less than four. In this case, the operation record data D41 output from the PBX41 may be sent not only to the computer 55 but also to other computer at the same time.

The extensions (terminal devices) 43, 53 and 63 may be, for example, a facsimile or the like. While in the present embodiment, the operation record data D41 output from the PBX41 is transmitted to the computer 55 all the time, it may be transmitted only when necessary. In addition, while in FIG. 2, the second communication control unit 41g is provided singly, it may be provided in the plural. In this case, the transmission destination control unit 41d needs to have as many functions as the number of the communication control unit 41g.

As described in the foregoing, according to the structure of the present invention, even when a failure occurs abruptly in one of a plurality of computers, loss of management data crucial for an operator can be avoided to enable quick replacement of a function because the same data is accumulated in other computer. Moreover, even when a certain computer is disposed at a place remote from other computer, no dedicated line for a computer other than a switched line is necessary, so that facilities can be simplified to reduce operation costs. Furthermore, even when managers operating the respective computers and operators of the respective terminal devices have residences and relationships changed due to a change of an organization of a place of business or a change of a job system, it is unnecessary to change facilities, which makes it possible to flexibly cope with the change.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A network linkage type private branch exchange system, comprising:

a plurality of private branch exchanges;

a plurality of telephone network interfaces for relaying data received from callers between a plurality of telephone networks and each said private branch exchange;

a plurality of terminal devices for transmitting said data between each said private branch exchange and a plurality of operators;

a plurality of computers each connected to each said private branch exchange for conducting predetermined processing based on said data; and a data communication line to which each said private branch exchange is connected, wherein said private branch exchanges are arranged and adapted to operate in an operating mode in which data intended to be processed in one of said computers connected to a first one of said private branch exchanges is routed through said first one of said private branch exchanges, through said data communication line, and through a second one of said private branch exchanges, to a second one of said computers connected to the second one of said private branch exchanges for processing.

2. The network linkage type private branch exchange system as set forth in claim 1, wherein the system is applied to mail-order reception work, and said first one of said private branch exchanges transmits accumulated data of mail-order reception sent through said telephone network and accepted at said terminal device to the second one of said computers for summing up said accumulated data through said data communication line.

3. The network linkage type private branch exchange system as set forth in claim 1, wherein each said private branch exchange automatically transmits said data to a respective associated one of said computers through said data communication line all the time.

4. The network linkage type private branch exchange system as set forth in claim 1, wherein each said private branch exchange transmits said data to a respective associated one of said computers through said data communication line when necessary.

5. The network linkage type private branch exchange system as set forth in claim 1, wherein each said private branch exchange further including a transmission destination control unit for determining whether said data is to be transmitted to the first one of said computers or to the second one of said computers, a first communication control unit for transmitting said data to the first one of said computers based on determination results of said transmission destination control unit, and one or a plurality of second communication control units for transmitting said data to the second one of said computers based on determination results of said transmission destination control unit.

6. The network linkage type private branch exchange system as set forth in claim 1, wherein said data communication line is formed of a switched line using said telephone network.

7. A method of controlling a network linkage type private branch exchange system including a plurality of private branch exchanges, a plurality of telephone network interfaces for relaying data received from callers between a plurality of telephone networks and each said private branch exchange, a plurality of terminal devices for transmitting said data between each said private branch exchange and a plurality of operators, a plurality of computers each connected to each said private branch exchange for conducting predetermined processing based on said data, and a data communication line to which each said private branch exchange is connected, the method comprising the steps of:

transmitting data intended to be processed in one of said computers connected to a first one of said private branch exchanges through said first one of said private branch exchanges, through said data communication line, and through a second one of said private branch exchanges, to a second one of said computers connected to the second one of said private branch exchanges; and processing the transmitted data at the second one of said computers.

8. The method of controlling a network linkage type private branch exchange system as set forth in claim 7, wherein the network linkage type private branch exchange system is applied to mail-order reception work, and accumulated data of mail-order reception sent through said telephone network and accepted at said terminal device is transmitted to the second one of said computers for summing up said accumulated data through said data communication line.

9. The method of controlling a network linkage type private branch exchange system a set forth in claim 7, wherein said data is automatically transmitted to a respective associated one of said computers through said data communication line all the time.

10. The method of controlling a network linkage type private branch exchange system as set forth in claim 7, wherein said data is transmitted to a respective associated one of said computers through said data communication line when necessary.

11. The method of controlling a network linkage type private branch exchange system as set forth in claim 7, wherein determination is made whether said data is to be transmitted to the first one of said computers or to the second one of said computers based on the determination results.

12. The method of controlling a network linkage type private branch exchange system as set forth in claim 7, wherein determination is made whether said data is to be transmitted to the first one of said computers or to the second one of said computers based on the determination results all the time.

13. The method of controlling a network linkage type private branch exchange system as set forth in claim 7, wherein for said data communication line, a switched line using said telephone network is used.

14. A computer readable memory storing a control program which realizes a function of a network linkage type private branch exchange system including a plurality of private branch exchanges, a plurality of telephone network interfaces for relaying data received from callers between a plurality of telephone networks and each said private branch exchange, a plurality of terminal devices for transmitting said data between each said private branch exchange and a plurality of operators, a plurality of computers each connected to each said private branch exchange for conducting predetermined processing based on said data, and a data communication line to which each said private branch exchange is connected, wherein said control program performs a method comprising the steps of:

transmitting data intended to be processed in one of said computers connected to a first one of said private branch exchanges through said first one of said private branch exchanges, through said data communication line, and through a second one of said private branch exchanges, to a second one of said computers connected to the second one of said private branch exchanges; and processing the transmitted data at the second one of said computers.

15. The computer readable memory storing a control program which realizes a function of a network linkage type private branch exchange system as set forth in claim 14, wherein the network linkage type private branch exchange system is applied to mail-order reception work, and accumulated data of mail-order reception sent through said telephone network and accepted at said terminal device is transmitted by said private branch exchange to the second one of said computers for summing up said accumulated data through said data communication line.

16. The computer readable memory storing a control program which realizes a function of a network linkage type private branch exchange system as set forth in claim 14, wherein said control program automatically transmits said data to a respective associated one of said computers through said data communication line all the time.

17. The computer readable memory storing a control program which realizes a function of a network linkage type private branch exchange system as set forth in claim 14, wherein said control program transmits said data to a respective associated one of said computers through said data communication line when necessary.

18. The computer readable memory storing a control program which realizes a function of a network linkage type private branch exchange system as set forth in claim 14, wherein said control program determines whether said data is to be transmitted to the first one of said computers or to the second one of said computers based on the determination results.

19. The computer readable memory storing a control program which realizes a function of a network linkage type private branch exchange system as set forth in claim 14, wherein said control program determines whether said data is to be transmitted to the first one of said computers or to the second one of said computers based on the determination results all the time.

20. The computer readable memory storing a control program which realizes a function of a network linkage type private branch exchange system as set forth in claim 14, wherein for said data communication line, a switched line using said telephone network is used.

21. A network of private branch exchanges (PBX) comprising:

plural bases that each have a PBX connected to a telephone network, a computer connected to said PBX, and a database connected to said computer;

a data communication line connecting a first said PBX to a second said PBX and connecting the second said PBX to a third said PBX;

wherein said bases are arranged and adapted to operate autonomously in a first operating mode, and wherein said bases are arranged and adapted to operate together in a second operating mode in which data received from calls handled by operators intended to be processed in one said computer in a first one of said bases and stored in said database connected to said one computer in the first one of said bases is routed through said PBX in the first one of said bases, through said data communication line, and through said PBX in a second one of said bases, to a second said computer in the second one of said bases for processing and storage in said database connected to said second computer in the second one of said bases.

* * * * *